United States Patent [19]
Sellari, Jr.

[11] 3,710,031
[45] Jan. 9, 1973

[54] MULTI FREQUENCY RECEIVER

[75] Inventor: Daniele Sellari, Jr., Corinth, Miss.

[73] Assignee: International Telephone and Telegraph Corporation

[22] Filed: Dec. 23, 1970

[21] Appl. No.: 100,950

[52] U.S. Cl. ............................................. 179/84 VF
[51] Int. Cl. ............................ H04m 1/50, H04q 9/12
[58] Field of Search ............. 179/84 VF; 330/109, 31

[56] References Cited

UNITED STATES PATENTS

| | | | |
|---|---|---|---|
| 3,140,357 | 7/1964 | Bischof | 179/84 VF |
| 3,128,349 | 4/1964 | Boesch | 179/84 VF |
| 3,470,532 | 9/1969 | Martens | 179/84 VF |
| 3,539,731 | 11/1970 | Legedza | 179/84 VF |
| 3,571,523 | 3/1971 | Herter | 179/84 VF |
| 3,293,371 | 12/1966 | Burns | 179/84 VF |

OTHER PUBLICATIONS

Reference Data for Engineers by I.T.T. Corp. (4 ed. 1943) p. 230
IBM Tech. Disc. Bulletin, Oct. 1968 p. 491
Mitra, "Synthesizing Active Filters," IEEE Spectrum, Jan. '69 at 60.
Welling, "Active Filters, Part 6", Electronics, Feb. 3, 1969 at 88.

*Primary Examiner*—Kathleen H. Claffy
*Assistant Examiner*—William A. Helvestine
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

A multi-frequency or voice frequency receiver is employed in telecommunication systems to receive and test digital signals from stations having multi-frequency control signalling facilities, and to receive digital information from similarly equipped data transmitting stations. The receiver has a number of tests which it performs on the received signals prior to passing the signals to the translators and decoders. The signals used are the standard eight tone, two group signals which are checked as to frequency, duration, the presence of one tone per group, minimum amplitude level and signal amplitude. In the receiver, the filter networks employ active filtering principles.

8 Claims, 8 Drawing Figures

Inventor
DANIELE SELLARI, JR.
BY Marvin Chaban
ATTY

MULTI FREQUENCY RECEIVER

BACKGROUND OF THE INVENTION

Historically, at the inception of multi-frequency pushbutton-actuated signalling, relays and electromechanical components were used wherever feasible, as the components most known in the art. For example, one system setting out the basic parameters required of an acceptable receiver is shown by U.S. Pat. No. 3,076,059 issued to L. A. Meacham et al. on Jan. 29, 1963 for Signaling System. Since that time there have been many attempts to produce solid state receivers providing the necessary degree of reliability and sensitivity.

A further paper of L. Gasser and E. Ganitta entitled "Speach Immunity of Push-Button Tone Signalling Systems Employing Tone Receivers with Guard Circuits" published in Electrical Communication in Volume 39, No. 2, 1964 on pages 220 et seq. sets forth generally the background of the art on which the present invention is based.

In the telecommunications industry, both telephone and data transmission use multi-frequency tones in the voice frequency range as the signalling medium. The tones must be separated, evaluated and channeled through a series of filtering networks. The networks used heretofore for these purposes have included passive components, primarily L-C circuits. More recently, active filters have been developed for this purpose although to date no such systems have successfully been able to serially couple the filtering network stages to provide the necessary degrees of accuracy and reliability.

Active filters combine within a network passive resistance-capacitance networks with amplifiers. Filters of this type are known and have been known for a number of years. Problems have arisen, however, in applying such filters into practical systems. Instability due to changes in environment and input signals has been a major factor impeding their use in commercial use. It is only with the advances in solid state technology that active filters have become feasible for use in circumstances requiring long range reliability, operation under varying conditions of temperature and continued use.

The features of some components for use in the present network is shown and described in my copending application Ser. No. 100,951, for Limiter for Voice Frequency Receiver filed of even date herewith.

SUMMARY OF THE INVENTION

The present invention relates to and has as its major object to provide a new and improved multi-frequency voice receiver for telephone pushbutton signalling.

It is a further object of the invention to provide an improved system for validating multi-frequency, voice band, code signals for processing through a telephone exchange.

It is a still further object of the invention to provide a voice frequency receiver capable of fabrication through the use of integrated circuits.

It is another object of the invention to provide a multi-frequency code checking system using solid state techniques which tests in an improved fashion the presence of a signal, its duration and its strength.

It is a still further object of the invention to provide a multi-frequency receiver employing active filtering networks throughout.

It is another object of the invention to provide a multi-stage system including a plurality of serially arranged filtering networks, each employing its own amplification.

The present invention produces a multi-frequency receiver using circuits capable of employing integrated circuits. In this way, the entire receiver is capable of being mounted in a very compact space, using low power. Further, interchangeable modules may be used requiring merely replacement of a defective module or all modules in cases of trouble.

These and other features, objects and advantages of the invention will become apparent from the accompanying drawings when viewed with the following descriptions.

DETAILED DESCRIPTION

Figure 1:
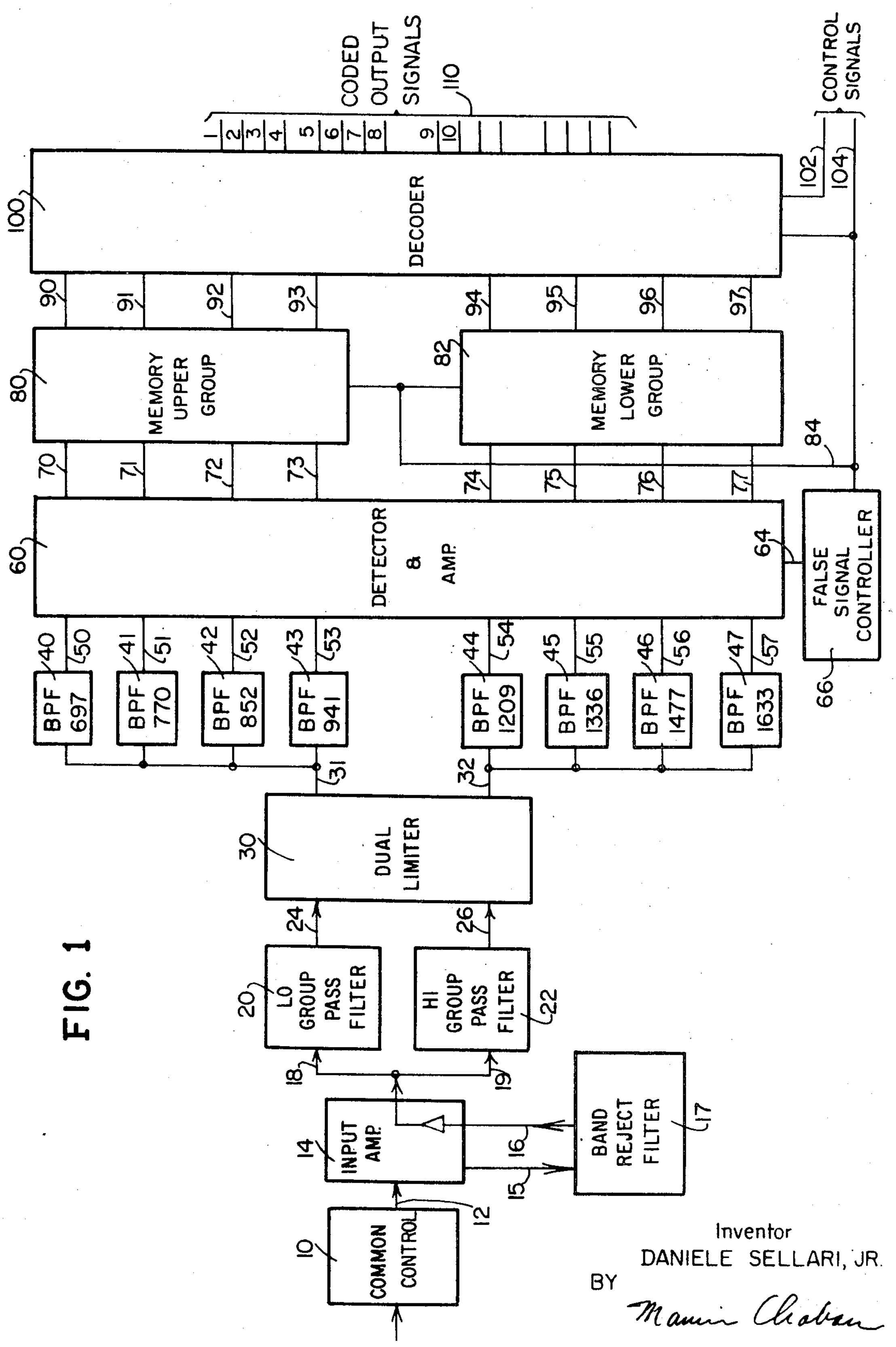
FIG. 1 is a block schematic circuit diagram of a system employing my invention.

In FIG. 1, I show a system for receiving and validating tone signals generated at a station instrument and transmitted to common control 10 for further transmission to the tone receiver and digit register forming the subject of this invention. While I show the input 12 to the system as deriving from the common control 10, this path may come through a telephone line circuit or other suitable path, the signals received thereover having been originated at a telephone subscriber station or data transmission terminal instrument (not shown) having multi-frequency signal generation.

As is well-known in the art, suitable oscillators respond to the depression of push buttons at a telephone instrument or data terminal to produce multi-frequency tones within the voice frequency band corresponding to the respective push button depressed. The tones are transmitted over the line in the sequence generated. The signals must be distinguished from any other tones or voices transmitted to the line, validated and translated into suitable binary code signals for transmission of the digital signal information to suitable memory equipment, switching systems or the like.

The frequencies employed have been standardized for telephone use. In general use at the present is the two out of eight code in which two frequencies out of the eight available constitute each digit. The frequencies are grouped into a high group and a low group, and a valid signal must include one frequency from each group. The generated signal must be of proper duration to differentiate from spurious signals and be classified as a valid signal. Each frequency signal must fall within a predetermined frequency range and be of at least minimum amplitude to be accepted and to constitute part of a valid signal.

It is these conditions and requirements that the present system is designed to meet.

In FIG. 1, I show the input 12 derived from common control 10 feeding an input amplifier 14. This amplifier provides high resistance bridging across the line, has inherent impedance matching and provides transient protection.

The signals received by amplifier 14 are sent to low band reject filter 17 which acts to reject all signals below 680 Hz. This upper limit of this band is below the tolerance level of the lowest tone signal frequency, i.e. 697 Hz. Filter 17 serves to reject all low frequencies such as those resulting from dial tone and the like. The signal passed by filter 17 is transmitted back over lead 16 to the amplification section of amplifier 14 and transmitted in multiple over leads 18 and 19 to the respective group pass filters 20 and 22.

The cutoff level for group filter 20 is 965 Hz., the filter passing only frequencies below that level. This cutoff level has been selected to pass to its output lead 24 all frequencies of the lower group including the signals within the acceptable tolerance range of the highest of the low frequency group, i.e. 941 Hz.

Signals passed by the respective group pass filters 20 and 22 on their respective output leads 24 and 26 in the form of sine waves are fed to the dual limiter circuit 30. The signals in the respective low and high groups are maintained separately, the signals are determined to be of sufficient amplitude to pass the acceptance threshold for shaping into an essentially square wave form. The sine wave must be a uniform one with equal positive and negative amplitudes to generate the essentially square wave or no output at all is passed from the limiter 30. From the limiter 30, high and low signals in essentially square wave are transitted to the respective band pass filter of the low group on lead 31, and to the band pass filters of the high group on lead 32.

A multiple path from lead 31 feeds the respective band pass filters of the low group filter 40 which passes the 697 Hz. band, filter 41 which passes the 770 Hz. band, filter 42 which passes the 852 Hz. band and filter 43 which passes the 941 Hz. band.

A multiple path from lead 32 is coupled to the respective band pass filters of the high group, i.e. filter 44 for 1209 Hz. band, filter 45 for the 1336 Hz. band, filter 46 for the 1477 Hz. band, and filter 47 for the 1633 Hz. band. If only ten digits and no other code signals are being used in the system, filter 47 may be omitted or its output may be blanked as this frequency is used only for adding digital information separate from the decimal ten digit system employed for telephone switching.

Each or these filters passes a frequency band within two of two and one half percent of the basic frequency for that filter, the emitted signal being sinusoidal in form. The individual filters 40–47 pass their respective output frequency bands to the Detector unit 60 over the respective leads 50–57. Unit 60 in conjunction with Valid Signal Controller 66 serves to validate the received signals for minimum duration, for strength and for group positioning.

A valid signal comprising one frequency tone in each group will pass its frequencies in the form of direct current spikes on respective leads 70–77 to the respective group memories 80 and 82. When these signals coincide with a valid signal indication on lead 84, the passed frequencies are stored for a delay period. When the proper signal duration has been reached, the frequencies stored are passed to the decoder 100 over the respective memory leads 90–97. The decoder 100 may be any known system which transmutes the frequencies into an output signal in decimal or binary-decimal form to enable or feed the signal to necessary switching equipment, data processing equipment or the like.

Before turning to the circuit in detail, a few notes should be inserted to explain symbols used. The well-known triangular symbol at the end of a lead is used to indicate a connection to the −12 volt source, and the standard symbol with three parallel lines of lessening length represents ground. The other voltage level sources are represented by terminals marked with the suitable voltage designation.

Figures 2, 4:
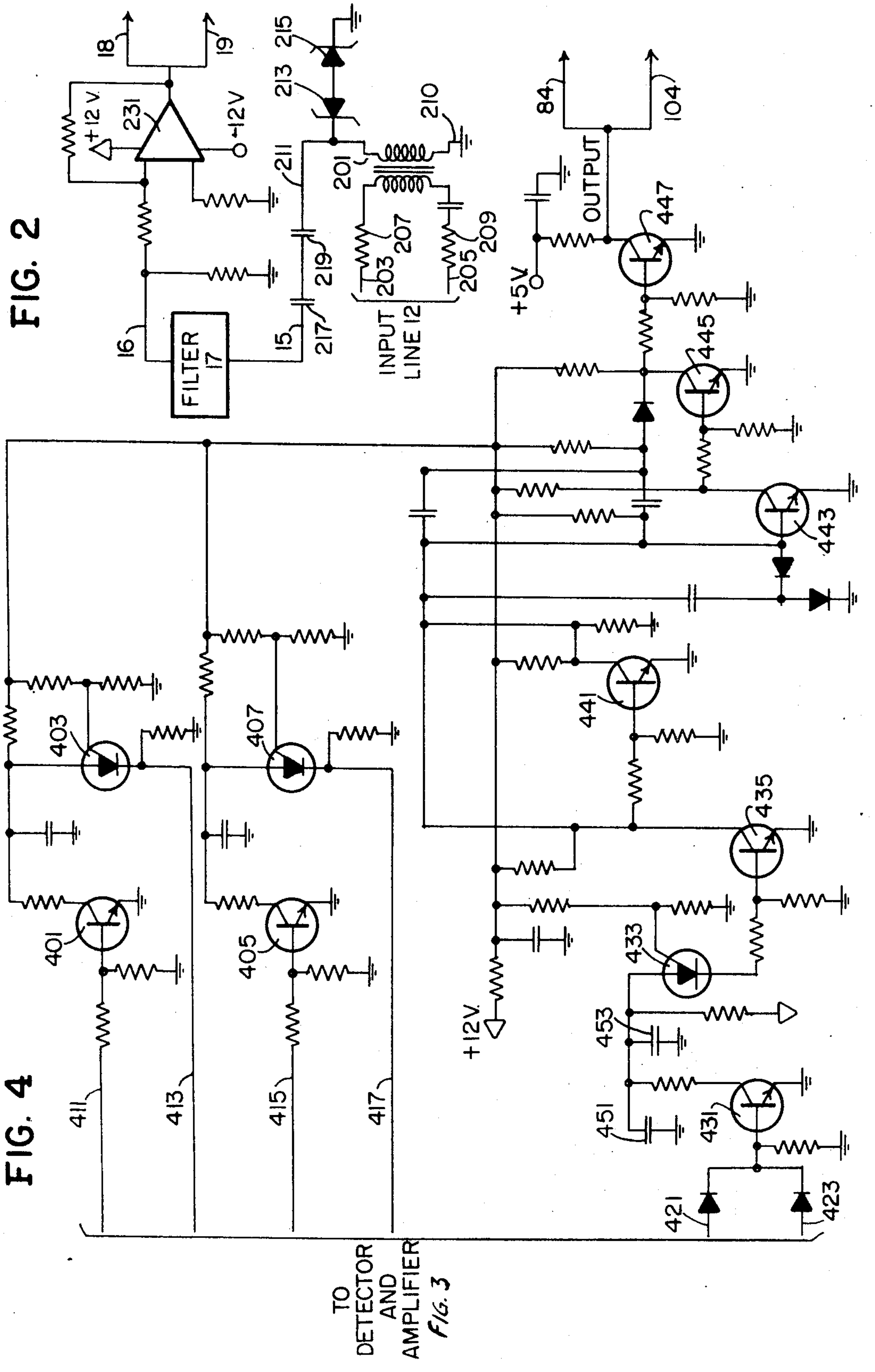
FIG. 2 is a schematic circuit diagram of an input amplifier circuit used in the system of FIG. 1.
FIG. 4 is a schematic diagram in greater detail of the false signal controller employing my invention.

In FIG. 2, I show the input amplifier 14 in greater detail. This amplifier provides a high resistance bridge across the input line 12. A transformer 201 bridges the line over the individual line leads 203 and 205, these line leads being connected to receive the tone bursts signals initiated at the line station for operating the receiver. Each of these line leads has a 10K resistor connected therein, the resistors being referred to by the reference numerals 207 and 209. These resistors 207 and 209 provide in combination with the resistance of the transformer 201, the high resistance bridge mentioned previously.

The secondary of transformer 201 has one of its leads 210 directly grounded and its other lead providing the output from the bridging network through lead 211. Lead 211 acts to produce transient protection to the subsequent network through back-to-back Zener diodes 213 and 215 and their connection to ground. Within the output lead 211 from the bridging network are positioned a pair of serially connected, identical tantalum capacitors 217 and 219 to provide an impedance matching network for the received signals. Within this matching network, an insertion loss of 10 dBV is introduced.

Signals received and transmitted over lead 211 pass over lead 15 to filter 17, which, as mentioned previously, filters out all signals of lower than 680 Hz. From the filter, the remaining signal including all tones above 680 Hz. passes over lead 16 to the operational amplifier 231. Amplifier 231 is a high gain amplifier which will not provide sufficient amplification on tones below −22 dB to initiate limiter action amplification. Therefore, it can be said that this amplifier has a threshold of −22 dBV.

The details of the dual limiter are not shown herein but are shown in my copending application noted above. In any event, only signals of above the minimal signal intensity level will be transmitted over the previously described filtering path to the detector 60 shown in detail in FIG. 3.

Figure 3:
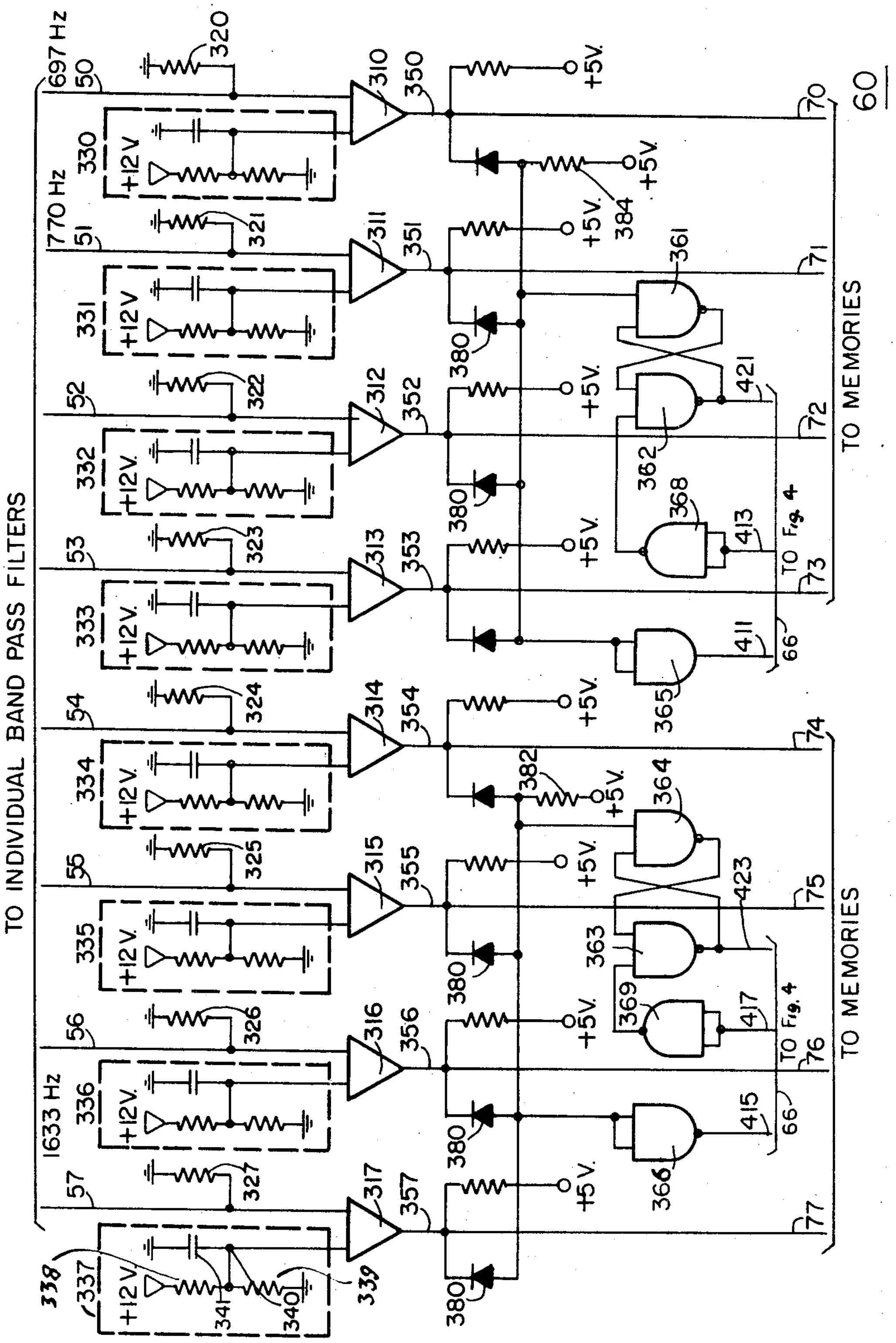
FIG. 3 is a schematic diagram in greater detail of the signal detector using my invention.

In FIGS. 3 and 4, I show in greater detail the detector 60 and false signal controller 66, which combinedly provide a number of safeguards and for preventing the reception and acceptance of false signals.

In FIG. 3, the leads 51–57 transmit the respective frequencies received from the band pass filters 40–47. As mentioned previously, the frequencies are classed in two categories — high and low. A signal must be received from each group. The detector compares the voltage level of the received signal against a standard, and when a signal of sufficient amplitude is received, the signal is amplified and sent to the memories 80 and 82. At this time the memories have not been enabled, as yet, and no signals are stored at this time. Any signal having sufficient amplitude causes a signal to be sent to the gating circuits.

To produce the enabling checks, each input lead 50–57 is connected to an individual amplifier numbered 310–317 respectively. Each input lead 50–57 has a resistance ground connection through respective heavy resistors 320–327. Each amplifier 310–317 has a voltage divider network numbered as 330–337 respectively. Each voltage divider network is comprised of a pair of resistors 338 and 339 bridging from +12 volts to ground. The resistance of resistor 338 is considerably greater than that of 339 to bias tap-off point 340 to a level slightly above ground.

Tap-off point 340 is grounded through capacitor 341. A signal received on one of the input leads is compared to the standard received from the corresponding voltage divider network. The direct current reference level to an amplifier from the input lead must be within 2db of maximum signal or the amplifier will not be triggered into conduction to pass the signal.

The output from each amplifier is connected to its respective output lead 350–357 which in turn is connected to the respective memories. These signals will, however, not be stored without a validity signal triggered by the high and low frequency gating networks, as will be explained.

The gating networks comprise NAND gates 361 and 362 in a latching arrangement for the low frequency group and a like pair of NAND gates 363 and 364 for the high frequencies. A signal feeding gate 365 for the low frequency group and 366 for the high frequencies and return gates 368 and 369 respectively complete the gates in the detector.

Within the false signal controller are two parallel transistor-actuated, unijunction transistors, one for the high group, the other for the low. Transistor 401 for the low group is connected to actuate unijunction transistor 403 and for the high group, transistor 405 is connected to actuate unijunction transistor 407. In each transistor network, there are bias resistors, and current limiting resistors and a charging capacitor, all of which function in generally known fashion to support the active components. Unijunctions 403 and 407 are silicon programmable unijunction transistors generically known as three terminal planar, passivated NPN devices.

Low group transistor 401 receives its input on lead 411 and its network transmits its output back to the detector on lead 413. High group network receives its input on lead 415 and transmits its output back on lead 417. The NAND gate circuit further feeds parallel leads 421 and 423 to the timing network within the false signal controller, which includes transistor 431 which controls the firing of unijunction transistor 433 which in turn drives transistor 435 and the coincidence network including transistors 441, 443, 445 and 447.

The cooperation of the NAND gates within the detector and the false signal indicator is as follows: In the normal condition, the +5 volt bias through resistors 382 and 384 maintain transistors 401 and 405 conductive. Assuming that a signal has been received by the high group, and one by the low group, and the signals have more than the minimum amplitude to pass through corresponding amplifiers of the 310–313 group and 314–317 group triggering the amplifiers receiving the signals, these amplifiers change their output from a +5 volts inactive state to an active ground-emitting state.

To illustrate this operation more clearly, let us assume for example that signals of 770 Hz. and 1336 Hz. have been received representing the digit 5. Amplifiers 311 and 315 will have been activated, changing the bias on leads 351 and 355 to ground.

When the ground signal is received on leads 351 and 355, transistors 401 and 405 are rendered non-conductive or blocking. The change in condition of the control transistors replaces the ground at the unijunction anode with a high voltage spike to trigger the unijunction into conduction to generate an output spike of current.

The current spike is transmitted back to the NAND gates 368 and 369 to change the state of latching NAND gates 361–362 and 363–364 and emit output pulses on leads 421 and 423. These pulses cause transistor 431 to shut off. The adjacent capacitors 451 and 453 trigger unijunction 433 into conduction to initiate a timing sequence. This timing sequence checks the coincidence of pulses from both groups for a predetermined minimum duration of 10 ms.

So long as the latched condition remains in force with NAND circuits 361–362 and 363–364, no change in condition occurs and timing continues. If the signal received from each group continues uninterrupted during the timing cycle, the timing circuit times itself out, and emits an output pulse to trigger timing indicator transistor 447 to enable the memories over lead 84. The memories will thereafter store signals received on leads 71 and 75. Control signals on lead 104 will further indicate a valid signal to controller 120, for any desired control purpose.

The output signal emitted by timing indicator transistor 447 on lead 84 is maintained for a period until the high and low signals terminate as received from amplifiers 311 and 315. At the time of termination of these signals, the +5 volts bias through resistors 382 and 384 replaces the ground signals to the NAND gates and reverses the bias on these gates. Transistors 401 and 405 are again rendered conductive shutting down unijunctions 403 and 407. These unijunctions are shut off by termination of the external signal rather than by any gating change. The NAND gates reset on the absence of the ground signals and cause timing indicator transistor 447 to shut off. Shut off of this transistor enables the decoder 100 to allow the stored signals from the memories to pass to the decoder for decoding and further processing as necessary.

If, however, the ground signals from either or both of the amplifiers had terminated prior to the end of the timing cycle, one or both of the NAND gates would have reset on the absence of signal restoring the transistors 401 and 405 and terminating the timing cycle prior to the conduction of output transistor 447.

The enabling time of the system through the filters and detectors may be on the order of 20 ms. Thus when this time is added to the 20 ms. coincidence period described above, a total period of approximately 40 ms. will have elapsed thus ensuring the continuation of signals for that period. The continuing signal requirement minimizes the possibility of spurious signals triggering an output, since it has been found that separating of push buttons requires a minimum of 30 ms. elapsed time. The release time of the filter networks account for the additional 10 ms., totalling the 40 ms. noted previously.

Thus by the system set out, we have rejected all signals of frequencies below a set frequency, allowed only signals within certain predetermined frequency bands of at least a threshold amplitude, insured that a signal in each of two frequency groups is present, and that the signals received and being checked are of at least a predetermined minimum duration.

Figure 5:
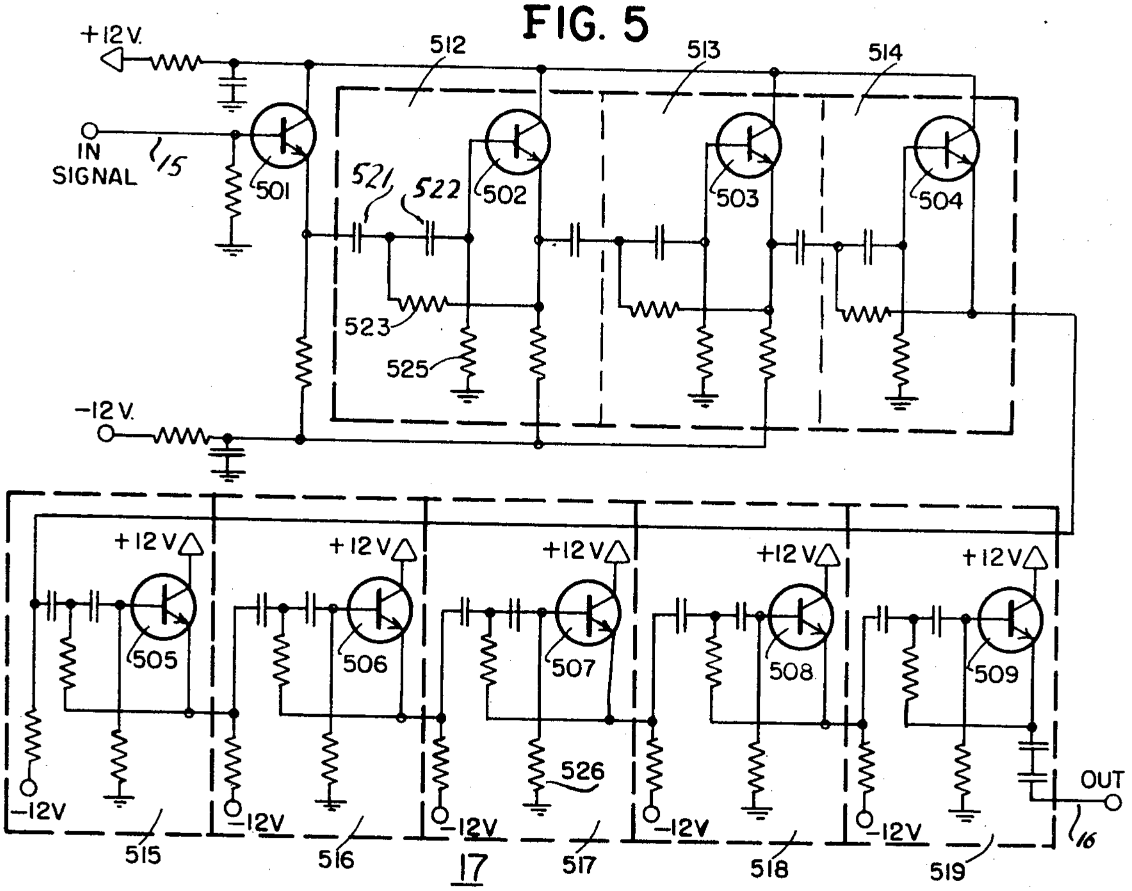
FIG. 5 is a schematic circuit diagram of a filtering network used as a high pass filter.

Now turning to the filtering networks as used herein, in FIG. 5, I show a high pass or band reject filter 17. This filter, as mentioned previously, rejects all frequencies below 680 Hz. In this way, signals generated by dial tone or random noises of a low frequency are rejected. Only signals within 2½ percent of the lowest code frequency 697 Hz. are passed, as are signals of higher frequencies.

For frequencies in the range of 680 Hz. to 1700 Hz. (the code frequency range) an insertion loss of 0 dB ± 0.5 dB is produced by this filter network 17.

In network 17, the signal received on lead 15 is originally amplified by transistor 501. Following the amplification, the signal or signals are passed through cascaded filtering sub-networks or stages 512–519. Each stage such as 512 has a T-filtering configuration including serially connected capacitors 521 and 522 with resistor 523 completing the configuration. The resistor 523 in stage 512 has greater resistance than its counterpart in stage 513, the resistances of counterpart resistors in subsequent stages 513–516 being successively smaller. The resistance of the counterpart resistor 524 in stage 517, however, is greater than the resistance of resistor 523, and the counterpart resistors thereafter in stages 518 and 519 are successively smaller. Resistance of resistor 525 is greater than any of the resistances of resistors 523 and 524 and their counterparts. Resistors counterpart to resistor 525 are successively greater in successive stages 513–516. Resistor 526 is, however, considerably less than the like resistor in the prior stages and is somewhat greater than the resistance of resistor 525. Capacitors throughout in the stages are identical.

By the configuration shown, the filter produces a steep roll-off and steep response characteristics at the demarcation frequency 680 Hz. The signal or signals passed at above 680 Hz. are returned on lead 16 for amplification as previously discussed with respect to amplifier 14 for subsequent passage to the group pass filters 20 and 22.

Figure 6:
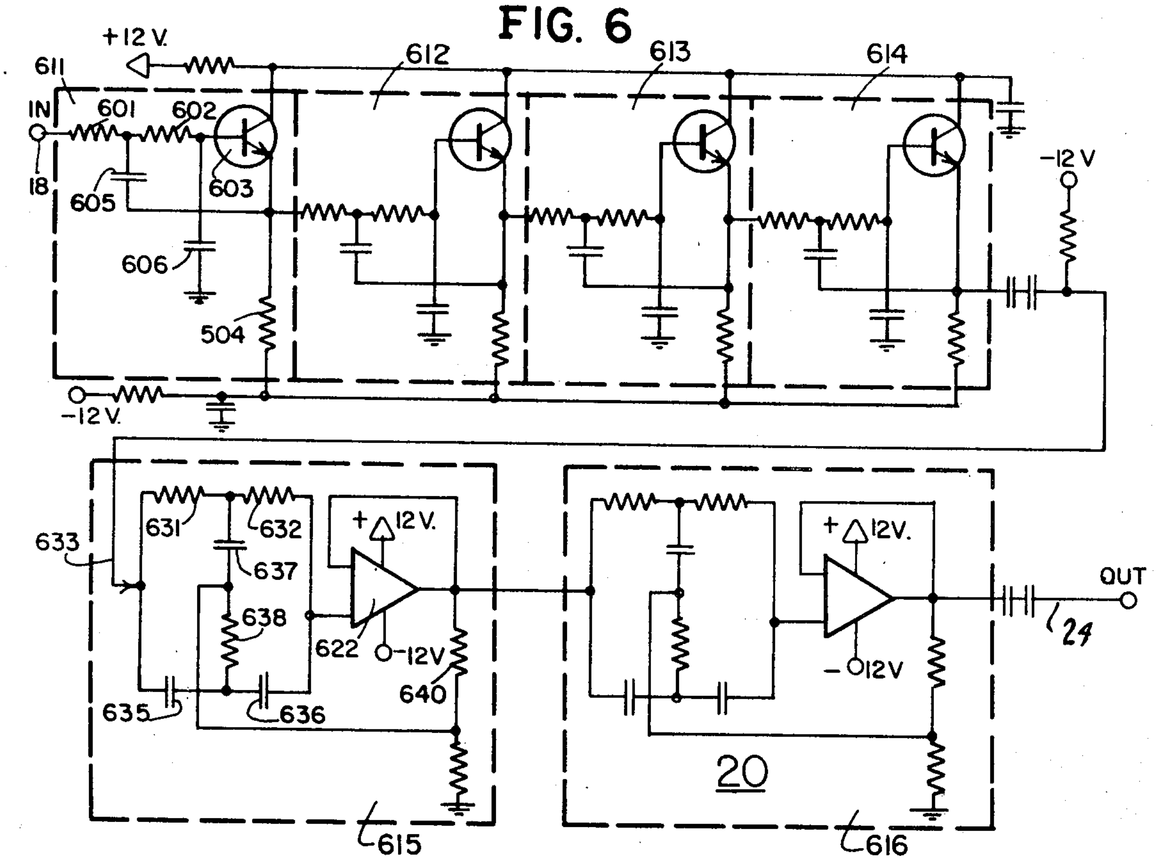
FIG. 6 is a schematic circuit diagram of a filtering network used as a low pass filter.
Figure 7:
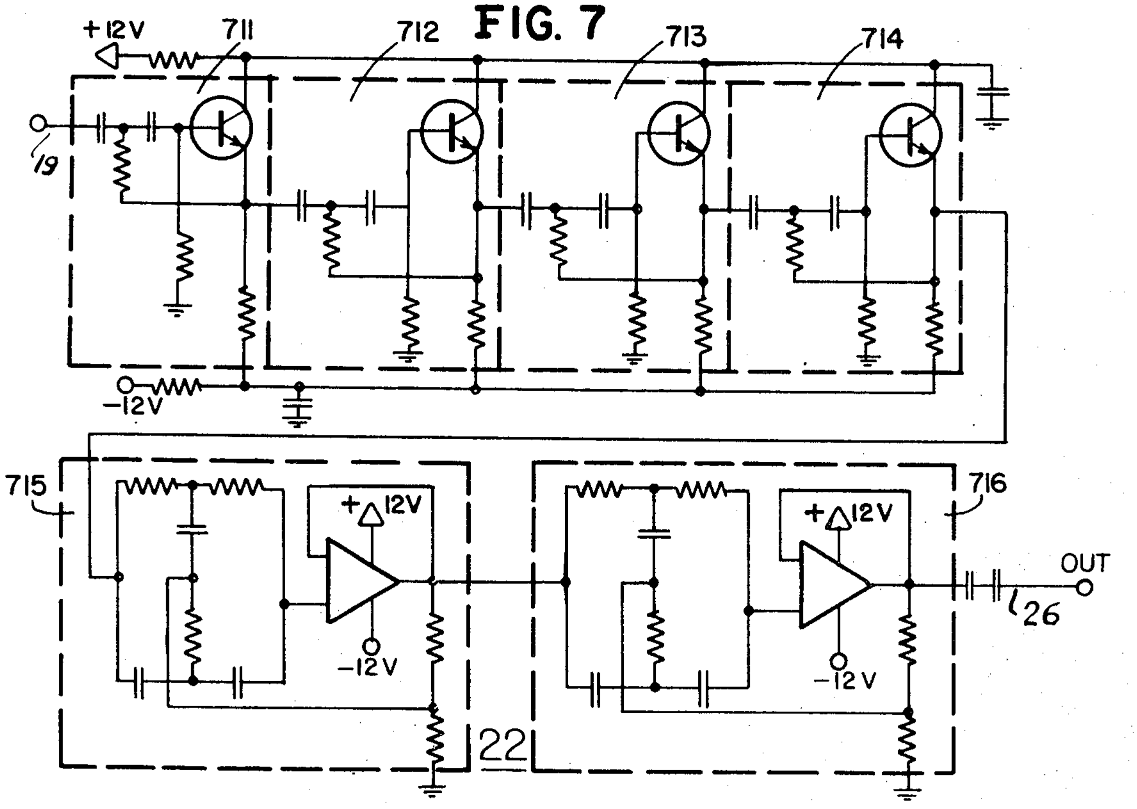
FIG. 7 is a schematic circuit diagram of a filtering network used as a high pass filter.

Filters 20 and 22 — FIGS. 6 and 7 — are similar in configuration comprising four transistorized cascaded T-stages followed by two cascaded T-stages, each with its own operational amplifier, totalling an 8 pole network.

In FIG. 6, the low pass filter network 20 receives its input on lead 18 from amplifier 14 and ground. Lead 18 is connected via series-connected resistors 601 and 602 to the base of emitter follower transistor 603. A feedback path for voltage developed across emitter resistor 604 is provided with capacitor 605 connected between the transistor emitter and the junction of resistors 601 and 602. Connected between the transistor base and the positive bias voltage source is capacitor 606. Within the stage, the stability of the network is assured, due to the relationship between the feedback voltage and the base voltage.

The first three stages 611, 612 and 613 have successively decreasing resistances and successively increasing capacitance in the T and feedback network. In the final transistor stage 614, resistances equal to that of stage 612 are used with capacitance greater than prior stages.

The final two stages within filtering network 20 include a twin T network 620 feeding an operational amplifier 622. The twin T comprises two resistors 631 and 632 connected in series between the input lead 633 and the input to the amplifier. A combination of series capacitors 635 and 636 are connected in parallel with the pair of resistors 631 and 632, with a capacitive-resistive series combination of capacitor 637 and resistor 638 connected between the midpoint of the series combinations. A feedback path from the amplifier output through resistor 640 to the midpoint of the capacitive resistive combination is provided as a feedback path 641 from the amplifier output to its input.

The two operational amplifiers and their networks are tuned for sharp cut-off characteristics at the high end of the frequency pass range, the lower end having been provided for within filter network 17.

The frequency response of this network is 0 dB ± 0.5 dB with respect to 800 Hz. within the 680 to 964 band with a signal input of approximately 76 mv. rms., and an output signal of 4.175 V rms. Insertion loss is approximately in the same amount as the frequency response.

The high pass filter 22 of FIG. 7 is similar to the filter of FIG. 6 except that the resistors and capacitors are necessarily juxtaposed in the transistorized stages 711–714, and of course the values of the circuit components differ. In this circuit also, the parameters of the capacitors and resistors 715 and 716 differ from one another. The resultant system provides a sharp cut-off characteristic at the bottom end of the pass range with no maximum on signals passed. The frequency response in this range is 0 dB ± 1.0 dB with respect to 800 Hz. Insertion loss in the 1179 to 1674 Hz. range ranges from −20 dB minimum to −28 dB maximum.

Figure 8:
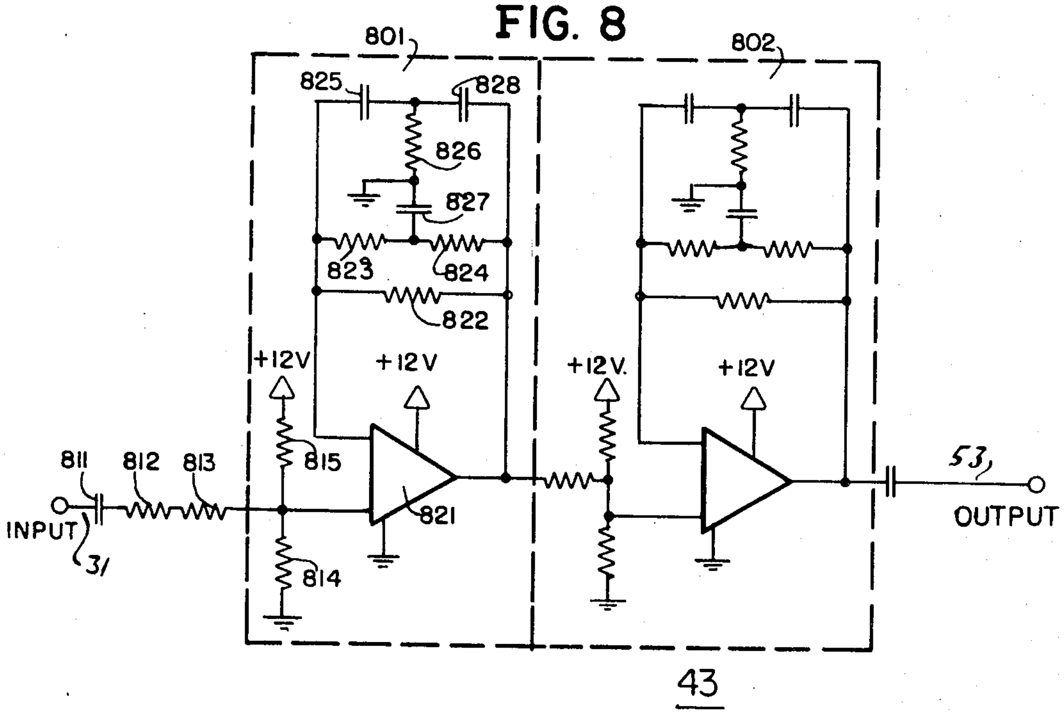
FIG. 8 is a schematic circuit diagram of a filtering network used as a band pass filter, herein.

In FIG. 8, we show a model frequency selective band pass filter network, for example filter network 43 which selects and transmits the 941 Hz. frequency. The other frequency selective, band pass filters used are similar in configuration and in their operating principle, the circuit parameters being changed for the specific frequencies to be selected and passed.

Filter network 43 uses two serially arranged stages 801 and 802, each having a twin T feedback path across an operational amplifier. The amplifiers are tuned slightly from one another to produce two pass frequencies spaced slightly from one another by approximately 5 percent to produce an essentially flat response over the frequency pass band. The twin peaks comprising the essentially flat response characteristic are spaced on both sides of the central frequency.

The input to each band pass filter is essentially a square wave received from limiter 30 on lead 31 (or 32). The input is multipled to the remaining selective filters 40–42, each being selective of a particular frequency, as described.

At the input to filter network 43 includes an attenuating network including capacitor 811 and series resistors 812 and 813. Resistor 813 is connected to the midpoint of a voltage divider comprising resistors 814 and 815 bridging the source from +12 volts to ground. The voltage divider midpoint is transmitted to one input 820 of operational amplifier 821.

A feedback path from the output of the amplifier 821 includes a resistor 822 and the twin network including matched resistors 823 and 824, and in parallel therewith matched capacitors 825 and 826. A resistive-capacitive serial path with its junction grounded includes resistor 827 and capacitor 828 connected between the midpoints of the parallel paths.

Filtering stage 802 is similar in configuration to stage 801 with its amplifier tuned slightly apart and its resistors having slightly less resistance to produce the spaced peak frequencies. Band pass filtering networks, as shown, are sharply tunable and when the sharp tuning is combined with the comparatively flat peak level produces a bank band a square wave throughout the particular band for which the filter is tuned.

I claim:

1. A multi-frequency receiver for receiving, validating and transmitting valid signals wherein a valid signal comprises a tone of a first group and a tone of a second group both within voice frequency range, comprising means for rejecting tones of lower than a predetermined minimum amplitude, means for separating tones into said first and second groups, means for amplifying said tones and for further separating said tones into selected specific tones within each group, control means receptive of tones from said first and second group of at least predetermined minimum amplitude, means responsive to tones received from both said groups for comparing the amplitude of the received tones to amplitude standards, means responsive to a tone in each group greater than said standards for actuating a timing sequence, individual latch means for each group actuated to start said timing sequence and responsive to both said tones continuing at above said amplitude standard for a predetermined period for maintaining said timing sequence in effect, means responsive to the end of said timing sequence for emitting an accept signal, said memory means responsive to said accept signal for enabling the storage of said received tones, and further means operative to translate received tones into a binary decimal code.

2. A receiver as claimed in claim 1, wherein said latch means comprises a four input, two gate latch network for each of said groups.

3. A receiver as claimed in claim 1, wherein all said tone separating means and said tone rejecting means comprise active filter networks.

4. A receiver as claimed in claim 1, wherein said further separating means comprise a plurality of filter circuits, each tuned to pass tones of a specific frequency, a pair of operational amplifiers serially connected in each of said filter circuits, and means for tuning each of said amplifiers for frequencies on each side of said specific frequency to approximate a flat peak response band.

5. A multi-frequency receiver for receiving individual tones of multi-frequency signals, wherein each of said tones comprises one or more signals in either a high or a low frequency group within the voice frequency range, the invention comprising: a plurality of combined filtering and amplifying stages for passing only a selected signals for each group within said range, a plurality of frequency selective stages with a separate active filter for each frequency selected, means commonly connected to the filters of each group and responsive to a frequency signal transmitted through a filter of each group for comparing said signals against amplitude standards, means responsive to both said signals exceeding said standards for initiating a timing sequence, means responsive to failure of continuation of either signal to exceed said standard after less than a full timing sequence for resetting said initiating means, and memory means for each signal frequency maintained in a disabled state by the resetting of said timing sequence.

6. A receiver as claimed in claim 5, wherein said initiating means comprises a gate circuit for each of said frequency groups, amplitude comparing means for each of said groups, said resetting means responsive to said amplitude comparing means sensing a signal of less than a predetermined amplitude in either of said groups for resetting said initiating means.

7. A receiver as claimed in claim 6, wherein said resetting means comprises an inverter latch network for each of said groups.

8. A receiver for a multi-frequency telecommunications signals comprising a plurality of cascaded stages of which there is a first stage including means for amplifying a frequency signal input and for rejecting all frequencies below a first minimum frequency, a second stage comprising a high and a low band pass filter network for passing frequency signals within the pass bands of the two filter networks, a third stage comprising a limiter circuit for each filter network for developing a square wave form for each frequency signal received; a plurality of selective band pass filter networks comprising the fourth stage of said network, said last-mentioned networks including means for passing only signals above a predetermined minimum amplitude level, a fifth stage comprising means for testing passed signals against an amplitude comparison standard, amplifier means responsive only to signals of higher amplitude than said standard for causing the initiation of a timing sequence, means for monitoring the continuance of said passed signals at higher amplitude than said standard for a predetermined time interval comprising said sequence, said monitoring means responsive to the discontinuance of at least one of said signals for terminating said timing sequence, means responsive to the normal ending of said timing interval for emitting an enabling signal, a memory stage for receiving frequency signals from said amplifier means, and means responsive to the termination of said sequence for disabling said memory stage from receiving said signals for storage.

* * * * *